United States Patent
Carnevali

(10) Patent No.: US 9,944,209 B1
(45) Date of Patent: Apr. 17, 2018

(54) HEIGHT ADJUSTABLE BEVERAGE HOLDER

(71) Applicant: National Products, Inc., Seattle, WA (US)

(72) Inventor: Jeffrey D. Carnevali, Seattle, WA (US)

(73) Assignee: National Products, Inc., Seattle, WA (US)

(*) Notice: Subject to any disclaimer, the term of this patent is extended or adjusted under 35 U.S.C. 154(b) by 0 days.

(21) Appl. No.: 15/397,666

(22) Filed: Jan. 3, 2017

(51) Int. Cl.
| | |
|---|---|
| *A47K 1/08* | (2006.01) |
| *B60N 3/10* | (2006.01) |
| *A47J 31/44* | (2006.01) |
| *F16M 13/02* | (2006.01) |
| *F16M 11/14* | (2006.01) |
| *A47G 23/02* | (2006.01) |
| *A45F 5/10* | (2006.01) |

(52) U.S. Cl.
CPC .......... *B60N 3/105* (2013.01); *A45F 5/10* (2013.01); *A47G 23/0225* (2013.01); *A47J 31/44* (2013.01); *B60N 3/103* (2013.01); *F16M 11/14* (2013.01); *F16M 13/022* (2013.01); *A45F 2200/0583* (2013.01); *F16M 2200/022* (2013.01)

(58) Field of Classification Search
USPC ...... 248/311.2, 314, 309.1, 312, 316.4, 318; 224/148.7, 197, 240, 242, 270, 272, 660, 224/677, 678; 220/742, 741, 737; 16/425, 422
See application file for complete search history.

(56) References Cited

U.S. PATENT DOCUMENTS

| | | | | |
|---|---|---|---|---|
| 2,838,202 | A * | 6/1958 | Huether | A47G 23/0266 220/741 |
| 3,979,011 | A * | 9/1976 | Schleicher | A47G 23/0266 220/287 |
| 4,570,835 | A * | 2/1986 | Criqui | B62J 11/00 224/414 |
| 4,708,273 | A * | 11/1987 | Grant | A45F 5/02 220/741 |
| 5,014,956 | A | 5/1991 | Kayali | |
| 5,029,793 | A | 7/1991 | Warner | |
| 5,320,263 | A * | 6/1994 | Kobylack | A63B 55/408 206/217 |
| 5,573,214 | A * | 11/1996 | Jones | B60N 3/103 248/205.5 |

(Continued)

*Primary Examiner* — Terrell L McKinnon
*Assistant Examiner* — Michael McDuffie
(74) *Attorney, Agent, or Firm* — Lowe Graham Jones PLLC; Bruce E. Black

(57) ABSTRACT

A beverage holding device includes a support platform, a spine, an upper support and a fixation mechanism. The spine includes a bottom portion and a top portion defining a spine length, and the bottom portion is fixed to the support platform. The upper support is configured and arranged to be adjustable along the spine relative to the support platform between a plurality of positions. The upper support includes at least one arm configured to at least partially encircle a portion of a beverage container when a bottom of the beverage container is seated on the support platform. And, the fixation mechanism is configured and arranged to secure the upper support to the spine at a selected one of the plurality of positions.

14 Claims, 5 Drawing Sheets

(56) References Cited

U.S. PATENT DOCUMENTS

| | | | | |
|---|---|---|---|---|
| 5,598,999 A * | 2/1997 | Plocher | B60N 3/102 | 224/281 |
| 5,842,671 A * | 12/1998 | Gibbs | A47G 23/0225 | 248/231.41 |
| 6,036,071 A * | 3/2000 | Hartmann | B60R 11/00 | 224/482 |
| 6,264,153 B1 * | 7/2001 | Ragner | B62J 11/00 | 224/482 |
| 6,435,469 B1 * | 8/2002 | Ratcliff | A45F 5/00 | 248/213.2 |
| 6,557,738 B1 * | 5/2003 | Meintzer | A45F 5/00 | 224/148.7 |
| 6,601,813 B1 * | 8/2003 | Kager | A45D 20/12 | 248/288.31 |
| 6,715,726 B1 * | 4/2004 | Dybalski | B60N 3/102 | 224/926 |
| D493,072 S * | 7/2004 | Palmer | D7/620 | |
| 6,983,918 B1 * | 1/2006 | Leasure | A63B 27/00 | 248/274.1 |
| 7,017,243 B2 * | 3/2006 | Carnevali | A45F 5/00 | 24/3.1 |
| 7,284,737 B2 * | 10/2007 | Kane | A47G 23/0225 | 248/226.11 |
| 7,451,956 B2 * | 11/2008 | Bohlen | E06B 9/323 | 248/220.21 |
| 7,562,854 B2 * | 7/2009 | Bieck | B60N 3/102 | 224/926 |
| 8,342,468 B1 | 1/2013 | Strickland | | |
| 8,500,076 B2 * | 8/2013 | Lai | A47G 23/0225 | 224/148.5 |
| 8,579,149 B2 | 11/2013 | Henke et al. | | |
| 8,757,573 B1 | 6/2014 | Barnes, Jr. | | |
| 9,016,650 B2 | 4/2015 | Thurman et al. | | |
| 9,016,651 B2 * | 4/2015 | Webb | A47G 23/0225 | 248/146 |
| 2002/0070324 A1 * | 6/2002 | Huang | A47G 23/0225 | 248/311.2 |
| 2003/0197104 A1 * | 10/2003 | Heybl | A47G 23/0225 | 248/311.2 |
| 2005/0269471 A1 * | 12/2005 | Wagner | B60N 3/102 | 248/311.2 |
| 2005/0269472 A1 * | 12/2005 | Wagner | B60N 3/102 | 248/311.2 |
| 2009/0236381 A1 * | 9/2009 | Buehler | B62B 5/00 | 224/411 |
| 2010/0084531 A1 * | 4/2010 | Schuchman | A47G 23/0225 | 248/311.2 |
| 2010/0096396 A1 * | 4/2010 | Doig | B60N 3/102 | 220/737 |
| 2013/0062493 A1 * | 3/2013 | Crawford | A47G 23/0225 | 248/311.2 |
| 2014/0231608 A1 * | 8/2014 | Fontaine | A47G 23/0225 | 248/311.2 |

* cited by examiner

HEIGHT ADJUSTABLE BEVERAGE HOLDER

FIELD

The present invention is directed to the area of beverage holding devices, assemblies, systems and methods of making and using the same. The present invention is also directed to beverage holding devices having an adjustable upper support moveable relative to a support platform for receiving and supporting beverage containers of different heights.

BACKGROUND

Conventional beverage holding devices for transporting a beverage container in a vehicle include recesses or cupholders located in a center console, a door or a dashboard region. Generally, such conventional devices are configured to receive beverage containers (e.g., coffee cups, soda cups, water bottles, etc.) having a narrowly defined configuration such as, but not limited to, no cup handle, a preferred height, and a preferred diameter.

BRIEF SUMMARY

In one embodiment, a beverage holding device includes a support platform, a spine, an upper support and a fixation mechanism. The spine includes a bottom portion and a top portion defining a spine length, and the bottom portion is fixed to the support platform. The upper support is configured and arranged to be adjustable along the spine relative to the support platform between a plurality of positions. The upper support includes at least one arm configured to at least partially encircle a portion of a beverage container when a bottom of the beverage container is seated on the support platform. And, the fixation mechanism is configured and arranged to secure the upper support to the spine at a selected one of the plurality of positions.

In at least some embodiments, a plurality of compressible members is coupled to the support platform. The compressible members are configured and arranged to reduce lateral movement of the beverage container relative to the support platform. In at least some embodiments, the plurality of compressible members includes fins that provide a radial force on the beverage container to center the beverage container relative to the support platform.

In at least some embodiments, the spine extends orthogonally relative to the support platform. In at least some embodiments, the upper support includes a guide coupled to the upper support, and the guide is configured to slideably engage with the spine. In at least some embodiments, the guide and the spine both include interfacing ridges to facilitate locking the upper support to the spine at the selected one of the plurality of positions. In at least some embodiments, the mechanism includes a threaded knob that urges the interfacing ridges together to facilitate locking the upper support to the spine at the selected one of the plurality of positions.

In at least some embodiments, the mechanism includes a cam rotatable to urge the interfacing ridges together to facilitate locking the upper support to the spine at the selected one of the plurality of positions.

In at least some embodiments, the plurality of positions includes four or more positions. In at least some embodiments, the plurality of positions includes ten or more positions. In at least some embodiments, the upper support is a sleeve. In at least some embodiments, the upper support includes a back portion having a height that is at least one-half the spine length.

Another embodiment is a beverage holding assembly that includes any of the beverage holding devices described above and a yoke coupled to the upper support and rotatable relative to the upper support about a first rotational axis. In at least some embodiments, a swivel mechanism is coupled to the yoke and rotatable relative to the upper support about a second rotational axis that is orthogonal to the first rotational axis. In at least some embodiments, the yoke is arranged to be a carrying handle. In yet another embodiment, a claw-shaped mounting assembly is coupleable to the swivel mechanism. The mounting assembly includes arms that are moveable from an open position to a clamped position, and vice-versa. In at least some embodiments, the claw-shaped mounting assembly includes at least one vibration damping feature.

A further embodiment is a beverage holding system that includes any of the beverage holding assemblies described above (which includes any of the beverage holding devices described above, and a mounting assembly coupleable to the swivel mechanism of the beverage holding assembly and attachable to a vehicle. In at least some embodiments, the mounting assembly includes a ball, a mounting plate, and a connector. The ball is coupleable to the swivel mechanism. The mounting plate is coupleable to the vehicle. And, the connector includes a first end portion and a second end portion, in which the first end portion is configured and arranged to receive the ball while the second end portion attachable to the mounting plate.

In at least some embodiments, the ball is elastomeric. In at least some embodiments, the mounting assembly includes at least one vibration damping feature.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified.

For a better understanding of the present invention, reference will be made to the following Detailed Description, which is to be read in association with the accompanying drawings, wherein.

DETAILED DESCRIPTION

The present invention is directed to the area of beverage holding devices, assemblies and systems, as well as methods of making and using the same. More specifically, the present invention is directed to an adjustable height beverage holding device that includes an upper support (e.g., a sleeve) moveable with respect to a support platform of the device. The moveable upper support permits the adjustable height beverage holding device to be quickly modified to hold beverage containers of many different heights or configurations. In at least some embodiments, the adjustable height beverage holding device may be coupled to a self-leveling apparatus, which in turn may be attached to a vehicle (e.g., cars, trucks, airplanes, boats, ATVs, motorcycles, etc.) by way of a mounting assembly or device. The beverage holding devices may be utilized in a wide variety of applications such as, but not limited to, rugged vehicles, industrial, military and defense, material handling as well as any application requiring a robust mounting solution.

By way of example, the mounting assembly or device may take the form of a ball and socket mounting system that revolves around an elastomeric rubber ball, incorporates non-slip features, as well as shock and vibration dampening features. Examples of such mounting assemblies and devices are described at U.S. Pat. Nos. 5,845,885; 6,561,476; 7,320,50; 7,997,554; 8,454,178; 8,505,861, RE42,060; RE42,581; and RE43,806, all of which are incorporated herein by reference, and are commercially as RAM® Mounts from National Products, Inc. It will be recognized that other mount assemblies or devices can also be used.

Figure 1:
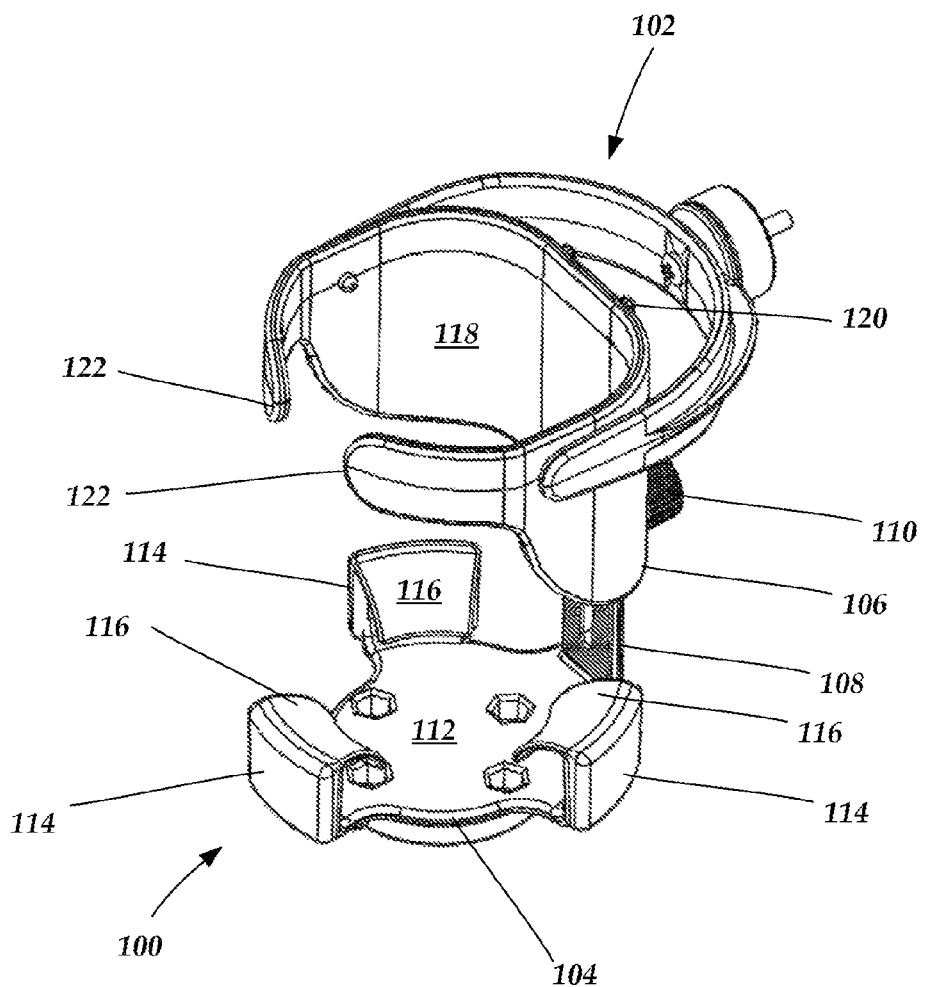
FIG. 1 is a schematic, perspective view of a beverage holding device with an adjustable upper support according to an embodiment of the present invention.
Figure 2:
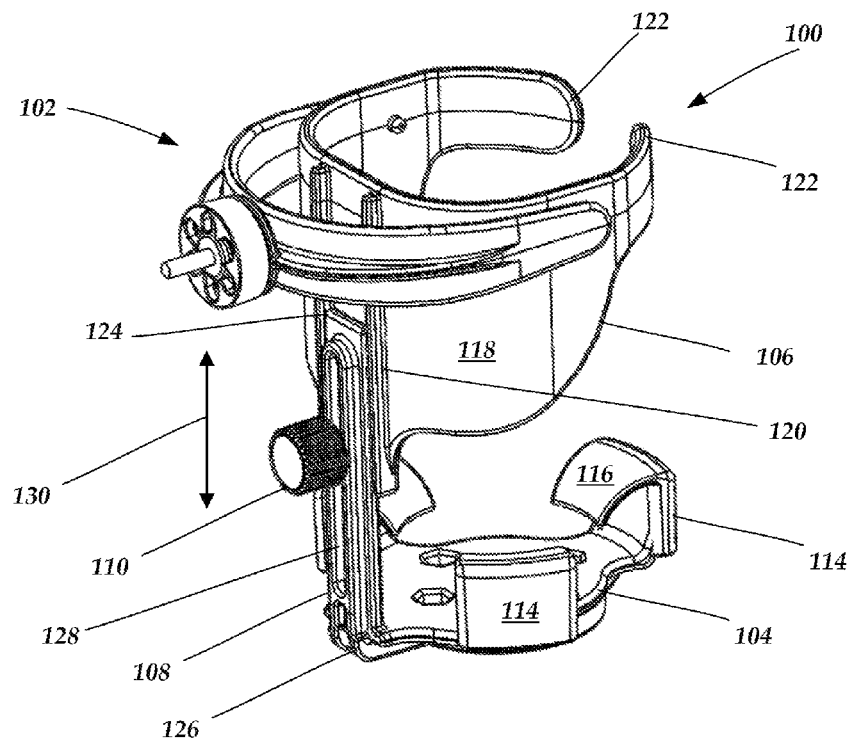
FIG. 2 is a schematic, perspective view of the beverage holding device of FIG. 1.

FIGS. 1 and 2 schematically illustrates a perspective view of a beverage holding device 100 coupled to a self-leveling apparatus 102. The beverage holding device 100 includes a support platform 104, a moveable upper support 106, a spine 108, and a fixation mechanism 110. The upper support 106 is moveable relative to the support platform 104, which in turn permits the beverage holding device 100 to receive beverage containers of differing heights or different configurations such as, but not limited to, paper-based coffee cups, plastic or metal cups, glasses, plastic or metal thermoses, and various types of water bottles.

The support platform 104 includes a base surface 112 onto which a bottom of a beverage container (not shown) is supported. Optionally, the support platform 104 includes one or more compressible members 114 (for example, tabs) that extend from the support platform 104. In at least some embodiments, the compressible members 114 can be spaced equidistant from each other, but other types of non-uniform or non-equidistant spacing can be used. In at least some other embodiments, each compressible member 114 includes a fin 116 attached to a top portion of the compressible member 114. The fins 116 generally extend inward toward the center of the base surface 112. In at least some embodiments, the fins 116 are made from a flexible and compressible material such as, but not limited to, rubber or plastic. The fins 116 act as bumpers to align and stabilize the beverage container (not shown). In at least some embodiments, the fins 116 provide a radial force on the beverage container to stabilize or center the beverage container relative to the support platform. Any suitable number of compressible members 114 and fins 116 may be used including one, two, three, four, or more.

The upper support 106 includes an upper support body 118, a guide 120 (FIG. 2—for example, a track or oppositely disposed rails), and may optionally include one or more arms 122 extending from the upper support body 118 to at least partially encircle a beverage container (not shown). The guide 120 may be coupled to or integrally formed with the upper support 106. Additional details about the guide 120 will be described below with respect to its interaction with the spine 108. The upper support body 118 and arms 122 may be made from a flexible material or a rigid material. The arms 122 may be adjustable with respect to the upper support body 118. For example, the arms 122 may be resilient and biased towards the upper support body 118 to more securely hold a beverage container. In other embodiments, the length or curvature of the arms 122 may be adjustable by the user.

One or more of the surfaces of the upper support body 118, the arms 122, the fins 116 or the base surface 112 that come into contact with the beverage container may include a non-slip coating or be made from a non-slip material to increase the friction between these surfaces and the beverage container.

The spine 108 includes a top portion 124 and a bottom portion 126 that define a length of the spine 108. The bottom portion 126 is fixed to the support platform 104 and the spine 108 preferably extends orthogonally from the support platform 104 and may include a portion that extends underneath the support platform 104 (as illustrated in FIG. 2). In at least some embodiments, the spine 108 includes an elongated slot 128 that is smaller than the length of the spine 108. As described in more detail below, the spine 108 slideably couples to the guide 120 of the upper support 106, which permits the upper support 106 to be moved or adjusted along the spine 108 as indicated by arrow 130.

Figure 3:
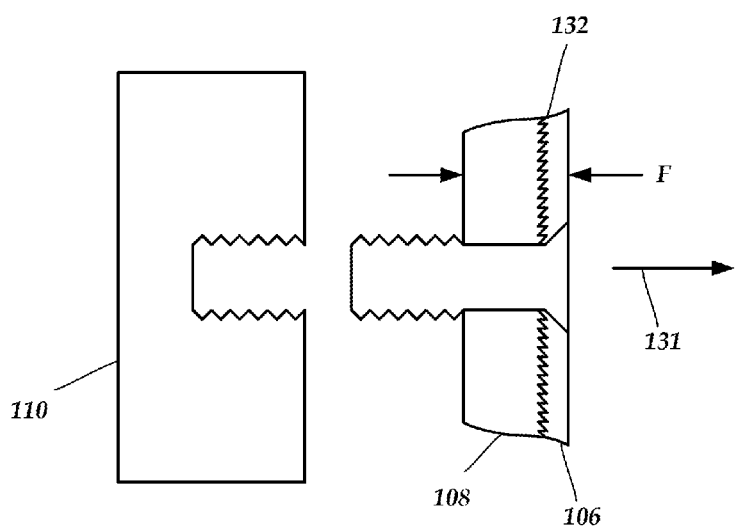
FIG. 3 is a schematic, partially exploded, cross-sectional view of a fixation mechanism for securing an upper support to a spine of the beverage holding device of FIG. 1 according to an embodiment of the present invention.

FIG. 3 shows a schematic, partially exploded, cross-sectional view of the interaction between the upper support 106 and guide 120, the spine 108, and the fixation mechanism 110. An arrow 131 points toward the center of the support platform 104 (FIG. 2). In at least some embodiments, the guide 120 and the spine 108 have complementary interfacing ridges 132; although such ridges are not required. A fastener 134 is fixed to the upper support 106 and extends through the slot 128 (FIG. 2) of the spine 108. In a preferred embodiment, the fixation mechanism 110 takes the form of an internally threaded knob that can be rotated in a tightening direction to urge the interfacing ridges 132 into contact as indicated by compressive force F, although other fastening mechanisms may also be used. To adjust the height of the upper support 106 relative to the support platform 104 (FIG. 2), the fixation mechanism 110 may be loosened by rotating in a loosening direction, which in turn releases the force F and allows the interfacing ridges 132 to separate. In turn, this permits the upper support 106 to be moved either toward or away from the support platform 104 (FIG. 2) such that the arms 122 (FIG. 2) of the upper support 106 may be appropriately located relative to a beverage container (not shown). In at least some embodiments, the upper support 106 may be moved to a plurality of positions along the spine 108, for example 2, 3, 4, 5, 6, 7, 8, 9, 10, 20, 30, 40, 50, or more positions.

Figure 4:
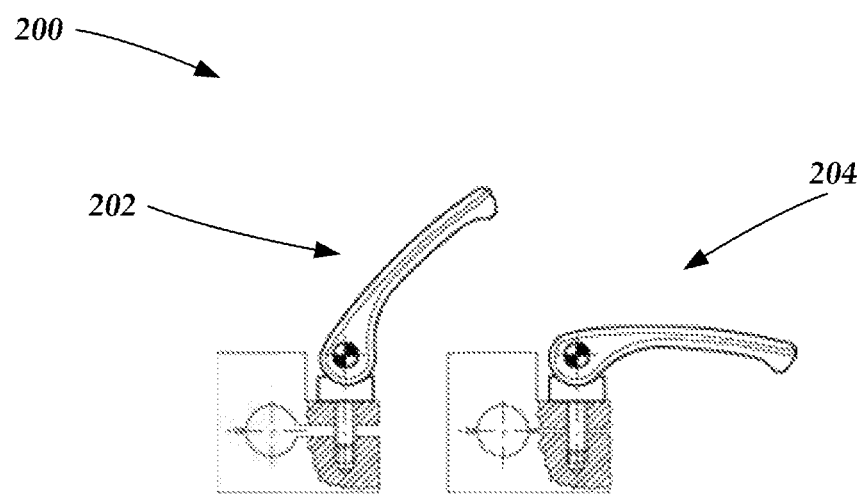
FIG. 4 is a schematic, side-elevational view of a levered cam fixation mechanism for the beverage holding device of FIG. 1 according to an embodiment of the present invention.

In at least another embodiment as schematically shown in FIG. 4, the fixation mechanism 110 may take the form of a levered cam 200 coupleable to a pin or detent extending from the upper support 106. The cam 200 may be placed in an open or non-clamped position 202 or in a closed or clamped position 204. When the cam 200 is in the clamped position 204, the interfacing ridges 132 (FIG. 3) of the upper support 106 and spine 108 are forced into tight contact such that the upper support 106 is not moveable relative to the spine 108.

In other embodiments, different types of fixation mechanisms may be used to secure the upper support to the spine such as, but not limited to, a magnetic coupler, various other types of fastening or camming assemblies, clamps, clips, or ratchet and pawl systems, or the like.

Figure 5:
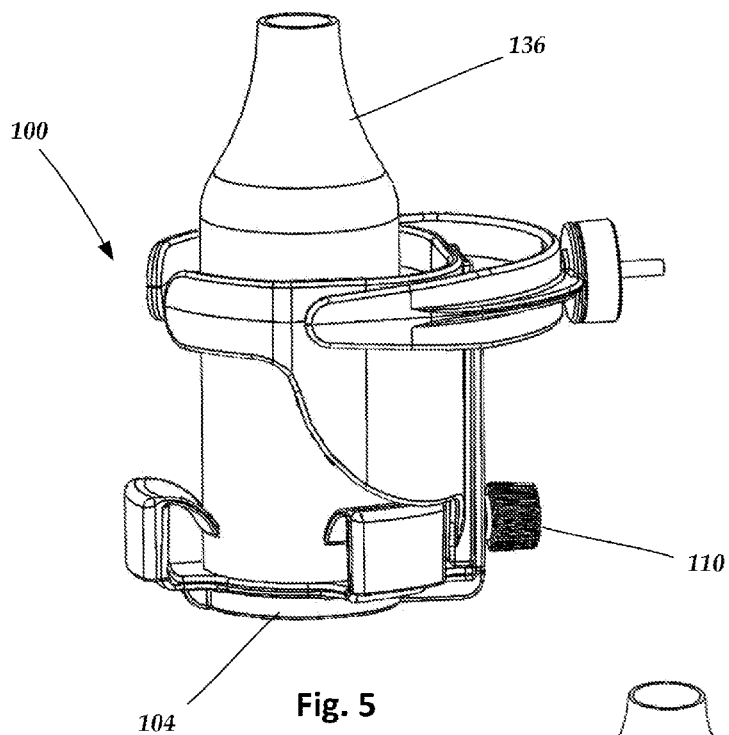
FIG. 5 is a schematic, perspective view of the beverage holding device of FIG. 1 with the upper support adjusted for a short beverage container according to an embodiment of the present invention.

FIG. 5 shows the beverage holding device 100 with a relatively short beverage container 136 received by the device 100. In the illustrated embodiment, the fixation mechanism 110 is positioned relatively close to the support platform 104 due to the short height of the beverage container 136.

Figure 6:
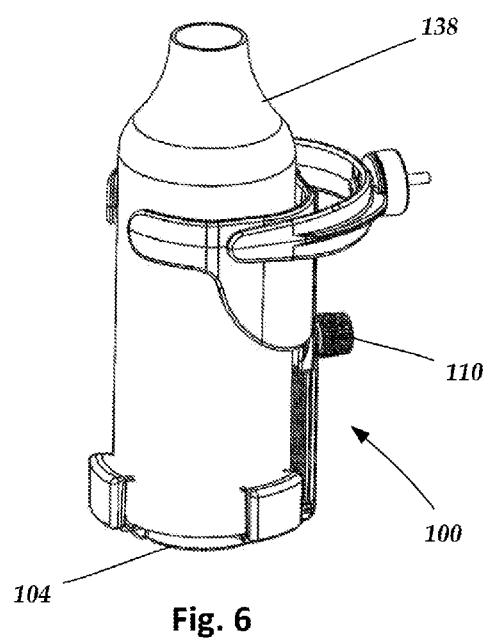
FIG. 6 is a schematic, perspective view of the beverage holding device of FIG. 1 with the upper support adjusted for a tall beverage container according to an embodiment of the present invention.

FIG. 6 shows the beverage holding device 100 with a relatively tall beverage container 138 received by the device 100. In the illustrated embodiment, the fixation mechanism 110 is positioned further away from the support platform 104 due to the height of the beverage container 138.

Figure 7:
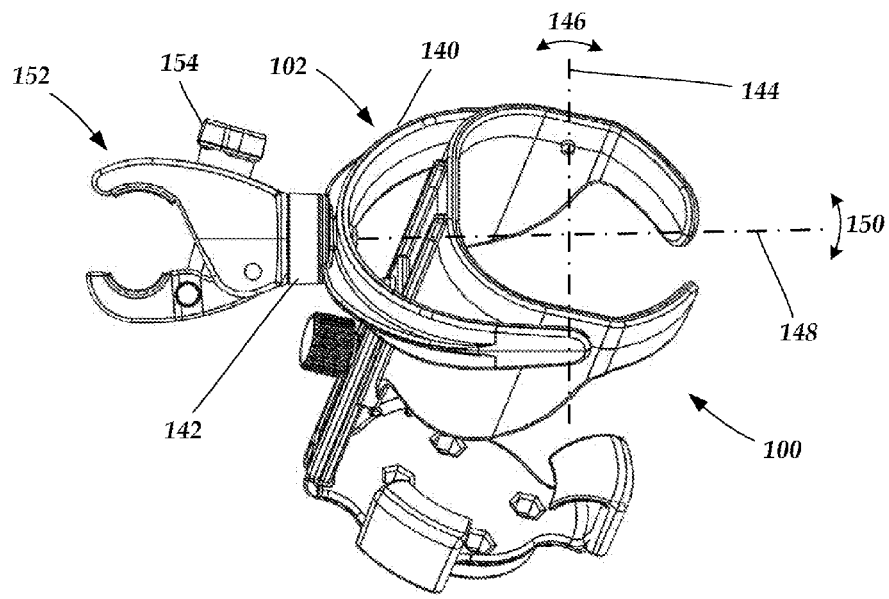
FIG. 7 is a schematic, perspective view of the beverage holding device of FIG. 1 mounted to a yoke and a swivel assembly, in which the swivel is coupled to a clamp-type mounting assembly according to an embodiment of the present invention.

FIG. 7 schematically illustrates the beverage holding device 100 coupled to the self-leveling apparatus 102, which includes a yoke 140 and a swivel 142. The yoke 140 may function as a handle for the beverage holding device 100 and pivots about a first rotational axis 144 as indicated by first arrow 146. The swivel 142 is coupled to the yoke 140 and pivots or rotates about a second rotational axis 148 as indicated by arrow 150. While the first and second axes 144 and 148 may be orthogonal to each other, it is appreciated that the first and second axes 144 and 148 may be non-orthogonal as well. The self-leveling apparatus 102, which allows rotation of the beverage holding device 100 functions as a gimbal system that helps keep the beverage container relatively upright with respect to the ground.

To install the beverage holding device 100 to a structural member (not shown), a claw-shaped mounting assembly 152 may be coupled to the swivel 142. The claw-shaped mounting assembly 152 may be opened using knob 154 to receive the structural member and then closed to clamp onto the structural member.

Figure 8:
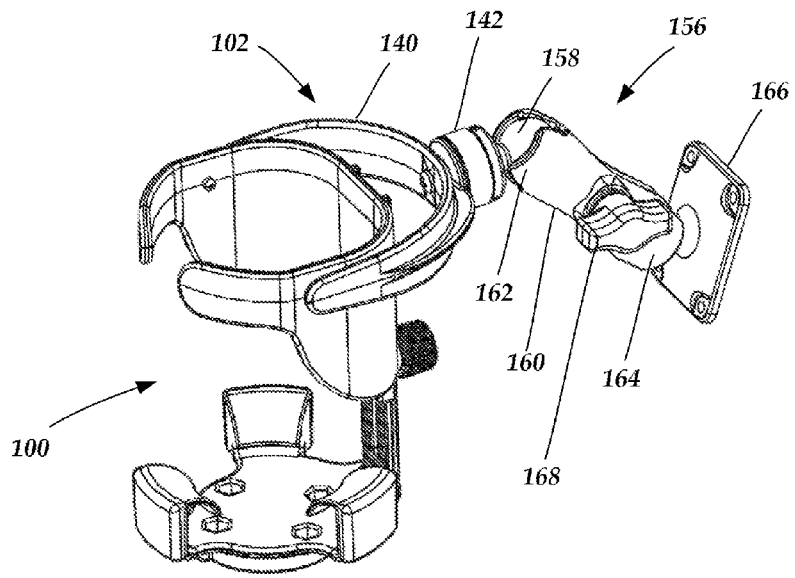
FIG. 8 is a schematic, perspective view of the beverage holding device of FIG. 1 mounted to a yoke and a swivel assembly, in which the swivel coupled to a ball-type mounting assembly according to an embodiment of the present invention.

FIG. 8 schematically illustrates the beverage holding device 100 coupled to the self-leveling apparatus 102, which in turn is coupled to a ball-type mounting assembly 156. A ball 158 is coupled to the swivel 142 and captured in a connector 160. A first end portion 162 of the connector 160 is configured to allow the ball 158 to freely rotate vis-à-vis the connector 160. A second end portion 164 of the connector 160 is coupled to a mounting plate 166, which may be mounted to a structural member within a vehicle. At least the first end portion 162 of the connector 160 may be clamped onto the ball 158 to secure the beverage holding device 100 in a desired position relative to the structural member. By way of example, a threaded rod (not shown) may extend through the connector 160 such that an internally threaded knob 168 may be rotated to release or clamp down on the connector 160, and thus the ball 158. In at least some embodiments, the ball is an elastomeric ball.

The above specification provides a description of the structure, manufacture, and use of the invention. Since many embodiments of the invention can be made without depart-ing from the spirit and scope of the invention, the invention also resides in the claims hereinafter appended.

What is claimed as new and desired to be protected by Letters Patent of the United States is:

1. A beverage holding device comprising:
   a support platform;
   a spine having a bottom portion and a top portion defining a spine length, the bottom portion fixed to the support platform;
   an upper support configured and arranged to be adjustable along the spine relative to the support platform between a plurality of positions to vary a separation between the support platform and the upper support, the upper support having at least one arm configured to at least partially encircle a portion of a beverage container when a bottom of the beverage container is seated on the support platform, wherein the upper support comprises a guide to the upper support, the guide configured to slideably engage with the spine, wherein the guide and the spine both include interfacing ridges to facilitate locking the upper support to the spine at a selected one of the plurality of positions; and
   a fixation mechanism configured and arranged to secure the upper support to the spine at the selected one of the plurality of positions, wherein the fixation mechanism includes a threaded knob that urges the interfacing ridges together to facilitate locking the upper support to the spine at the selected one of the plurality of positions.

2. The beverage holding device of claim 1, further comprising a plurality of compressible members coupled to the support platform, the compressible members configured and arranged to reduce lateral movement of the beverage container relative to the support platform.

3. The beverage holding device of claim 2, wherein the plurality of compressible members comprises fins that provide a radial force on the beverage container to center the beverage container relative to the support platform.

4. The beverage holding device of claim 1, wherein the spine extends orthogonally relative to the support platform.

5. A beverage holding device comprising:
   a support platform;
   a spine having a bottom portion and a top portion defining a spine length, the bottom portion fixed to the support platform;
   an upper support configured and arranged to be adjustable along the spine relative to the support platform between a plurality of positions to vary a separation between the support platform and the upper support, the upper support having at least one arm configured to at least partially encircle a portion of a beverage container when a bottom of the beverage container is seated on the support platform, wherein the upper support comprises a guide coupled to the upper support, the guide configured to slideably engage with the spine, wherein the guide and the spine both include interfacing ridges to facilitate locking the upper support to the spine at a selected one of the plurality of positions; and
   a fixation mechanism configured arranged to secure the upper support to the spine at the selected one of the plurality of positions, wherein the fixation mechanism includes a cam rotatable to urge the interfacing ridges together to facilitate locking the upper support to the spine at the selected one of the plurality of positions.

6. The beverage holding device of claim 1, wherein the plurality of positions includes four or more positions.

7. The beverage holding device of claim 1, wherein the upper support s a sleeve.

8. The beverage holding device of claim 1, wherein the upper support includes a back portion having a height that is at least one-half the spine length.

9. A beverage holding system comprising:
a beverage holding device comprising
   a support platform,
   a spine having a bottom portion and a top portion defining a spine length, the bottom portion fixed to the support platform,
   an upper support configured and arranged to be adjustable along the spine relative to the support platform between a plurality of positions to vary a separation between the support platform and the upper support, the upper support having at least one arm configured to at least partially encircle a portion of a beverage container when a bottom of the beverage container is seated on the support platform, and
   a fixation mechanism configured and arranged to secure the upper support to the spine at a selected one of the plurality of positions;
a yoke coupled to the upper support and rotatable relative to the upper support about a first rotational axis;
a swivel mechanism coupled to the yoke and rotatable relative to the upper support about a second rotational axis that is orthogonal to the first rotational axis; and
a claw-shaped mounting assembly coupleable to the swivel mechanism, the mounting assembly having arms moveable between an open position and a clamped position.

10. The beverage holding system of claim 9, wherein the yoke is arranged to be a carrying handle.

11. The beverage holding system of claim 9, wherein the claw-shaped mounting assembly includes at least one vibration damping feature.

12. A beverage holding system comprising:
a beverage holding device comprising
   a support platform,
   a spine having a bottom portion and a top portion defining a spine length, the bottom portion fixed to the support platform,
   an upper support configured and arranged to be adjustable along the spine relative to the support platform between a plurality of positions to vary a separation between the support platform and the upper support, the upper support having at least one arm configured to at least partially encircle a portion of a beverage container when a bottom of the beverage container is seated on the support platform, and
   a fixation mechanism configured and arranged to secure the upper support to the spine at a selected one of the plurality of positions:
a yoke coupled to the upper support and rotatable relative to the upper support about a first rotational axis;
a swivel mechanism coupled to the yoke and rotatable relative to the upper support about a second rotational axis that is orthogonal to the first rotational axis; and
a mounting assembly coupleable to the swivel mechanism and attachable to a vehicle, the mounting assembly comprising
   a ball coupleable to the swivel mechanism,
   a mounting plate coupleable to the vehicle, and
   a connector having a first end portion and a second end portion, the first end portion configured and arranged to receive the ball, the second end portion attachable to the mounting plate.

13. The beverage holding system of claim 12, wherein the ball is elastomeric.

14. The beverage holding system of claim 12, wherein the mounting assembly includes at least one vibration damping feature.

* * * * *